Patented Feb. 22, 1944

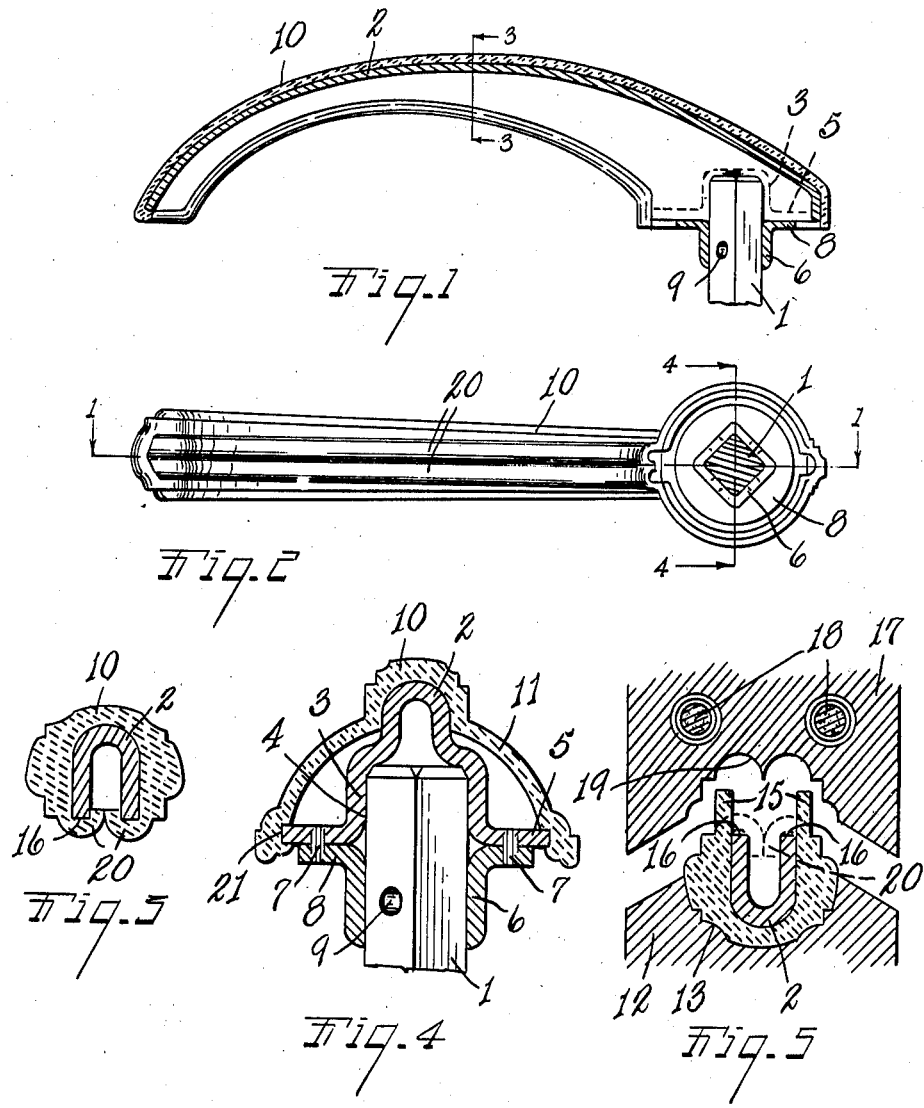

2,342,402

UNITED STATES PATENT OFFICE 2,342,402

DOOR HANDLE

Gerald V. Jakeway, Grand Rapids, Mich., assignor to Keeler Brass Company, Grand Rapids, Mich., a corporation of Michigan Application May 26, 1941, Serial No. 395,127

9 Claims. (Cl. 292—347)

This invention relates to improvements in door handle.

The main objects of this invention are:

First, to provide a hardware article such as automobile door handles, remote control handles, drawer pulls, and the like which are very attractive in appearance, strong and durable, and may be very economically produced.

Second, to provide hardware of the type described which has no exposed metal parts requiring plating or other finishing.

Third, to provide a method of fabricating and assembling articles of the type described which is speedy and economical.

Objects relating to details and economies of the invention will appear from the description to follow. The invention is defined and pointed out in the claims.

A preferred embodiment of the invention is illustrated in the accompanying drawing, in which:

Fig. 1 is a fragmentary view mainly in longitudinal section on a line corresponding to line 1—1 of Fig. 2 of an automobile door handle embodying my invention.

Fig. 2 is an inside or bottom plan view of the structure shown in Fig. 1, the spindle being shown in section.

Fig. 3 is an enlarged transverse section on a line corresponding to line 3—3 of Fig. 1.

Fig. 4 is an enlarged transverse fragmentary section on line 4—4 of Fig. 2, the chill or spindle being shown in full lines and partially broken away.

Fig. 5 is a fragmentary sectional view illustrating certain of the steps of manufacture and apparatus for use therein.

In the embodiment of my invention illustrated in the accompanying drawing, 1 represents the spindle or chill of an automobile door handle. The handle proper comprises the metal handle bar or core 2 which is preferably formed as a sheet metal stamping. This handle bar 2 is of general channel section disposed with the channel facing inwardly. At the base or spindle end of the handle, the sides of the core are offset and conformed to provide supplementary socket members 3 providing a recess or socket 4 for the inner end of the spindle 1.

The inner end of the core is further conformed to provide circular flanges 5 to which the drawn socket member 6 is secured by spot-welding at 7, the socket member 6 having out-turned flange portions 8 to facilitate securing the parts together.

The socket member 6 is aligned with the recess 4 so that the spindle extends through the socket member 6 into the recess, forming a very secure connection for the spindle to the handle bar or core. The spindle is provided with a pin receiving hole 9.

The casing or sheath 10 is formed by molding from non-metallic plastic material or thermoplastic material. "Tenite" is found very suitable for this purpose but there are other moldable thermo-plastic materials that may be used.

The casing member 10 is of channel section adapted to receive a handle bar or core member 2 as is shown in Fig. 4, the handle bar or core member being longitudinally curved and the casing is correspondingly curved or shaped. It is provided at its base end with an enlargement 11 embracing the flange 5, see Fig. 4.

In assembling the casing upon the core, the casing is arranged in a die member 12 having a recess 13 shaped to receive the casing and preferably to support the front portion or face thereof throughout, the core member 2 being arranged within the casing member, either before they are placed in the die or afterwards. It will be noted that with the parts thus assembled, the wing-like portions 15 of the casing member project substantially beyond the longitudinal edges 16 of the core member.

The die member 17 is provided with heating elements shown conventionally at 18, the face of the die having curved portions 19 shaped to engage the wing portions 15 of the casing and gradually turn them or fold them inwardly around the edges 16 to the position shown by dotted lines 20 in Fig. 5 or as shown in Fig. 3. The die members are closed in such relation to the heating elements that the wing sections 15 are rendered moldably bendable and they are gradually brought into the infolded abutting relation shown in Fig. 3 in which position they close the channel of the core member so that only the plastic casing is exposed except at the base which of course is juxtaposed to the door or other object upon which the handle is mounted.

The casing has internal recesses 21 receiving the flanges 5. These may be either formed by the heat assembled die step or the casing may be formed with the recesses 21 therein and snapped or sprung upon the flanges 5.

While I have illustrated and described my invention as embodied in a door handle and the method of making the same, it will be understood that it may be embodied in remote controls, drawer pulls, and other hardware articles of this general character.

The finished article is very attractive in appearance and there are no exposed metal parts requiring plating or finishing and this results in a very substantial saving in the matter of manufacture as well as in the saving of metals which are now in large demand for other purposes. The plastics, such as "Tenite" may be variously colored to match interior trim or the general finish of the object on which the hardware is to be used and it may be of various external configurations also to meet the particular requirements. The inturned abutting portions of the casing may be fused by heat or autogenously united by means of solvent if desired although that is believed not to be necessary for most uses.

I have illustrated and described my improvements in an embodiment which I have found to be highly desirable. I have not attempted to illustrate or describe various possible adaptations to other types and shapes of handles such as remote controls, drawer pulls, furniture handles, and the like, as it is believed that this disclosure will enable those skilled in the art to embody or adapt my invention as may be desired.

It should be understood that the foregoing terminology is used descriptively rather than in a limited sense and with the intention to include equivalents of the features shown and described within the scope of the following claims.

Having thus described my invention, what I claim as new and desire to secure by Letters Patent, is:

1. In a hardware article, the combination of a core member of inwardly facing channel section formed as a sheet metal stamping, the walls of the core member being conformed at the base thereof to provide a supplemental spindle socket and laterally projecting circular flanges, a spindle socket member spot-welded to said flanges and having a socket aligned with said supplemental socket of said core member, and a casing of channel section formed of thermoplastic material and nestingly embracing said core member, the edges of said casing member being extended around the edges of said core member, said casing member having an enlarged circular base portion embracing said flanges on said core member and having internal recesses receiving the edges thereof.

2. In a hardware article, the combination of a core member of inwardly facing channel section, the walls of the core member being conformed at the base thereof to provide laterally projecting circular flanges, and a casing of channel section formed of thermoplastic material and nestingly embracing said core member, the edges of said casing member being extended around the edges of said core member, said casing member having an enlarged base portion embracing said flanges on said core member and having internal recesses receiving the edges thereof.

3. In a hardware article, the combination of a core member of inwardly facing channel section, and a casing of inwardly facing channel section formed of thermoplastic material and embracing said core member, the edges of said casing member being extended substantially 180° around the edges of said core member into inturned abutting relation to one another within the core member and closing the channel of the same.

4. A hardware article of the type described comprising a metal base member of generally U-shape section and an ornamental covering therefor, comprising a preformed, generally U-shaped, hollow casing nestingly engaged with said base member, said casing being fabricated of a non-metallic thermoplastic material, the free edges of said casing being extended around the side edges of said base member and disposed interiorly of the latter to secure the parts in assembled relation.

5. An article of hardware of the type described comprising a metal body member having spaced inwardly projecting flanges, and an ornamental covering therefor comprising a preformed generally U-shaped, hollow casing nestingly engaged with said body member externally thereof, said casing being fabricated of non-metallic thermoplastic material, the free edges of said casing extending inwardly and being extended about the edges of said body member flanges and disposed interiorly of the latter.

6. In a hardware article, the combination of a core member having inwardly projecting spaced flanges, and a hollow, generally U-shaped casing formed of thermoplastic moldable material, said core member being arranged within said casing member, the edges of said casing member being extended around the flanges of said core member into internal abutting relation to one another within and between the flanges.

7. In a hardware article, the combination of a core member having inwardly projecting spaced flanges, and a hollow, generally U-shaped casing formed of thermoplastic moldable material, said core member being arranged within said casing member, the edges of said casing member being extended around and between the flanges of said core member.

8. An article of the type described, comprising a metallic body member having border flanges, and an ornamental covering therefor comprising a preformed, generally U-shaped, hollow casing of thermoplastic material disposed upon said body member, the edges of said plastic material being extended about the flanges of said body member and disposed interiorly of and between said flanges.

9. A hardware member comprising a hollow preformed, generally U-shaped casing member of non-metallic, ornamental, thermoplastic material, and a core member nestingly arranged within said casing member and provided with border flanges, said casing member having the edges thereof extended around said core member border flanges and disposed within and between the same.

GERALD V. JAKEWAY.